A. L. HOLMES.
METER CONNECTION.
APPLICATION FILED NOV. 4, 1907.

913,892.

Patented Mar. 2, 1909.

Witnesses

Inventor
Alba L. Holmes
By Ithiel J. Cilley
Attorney

UNITED STATES PATENT OFFICE.

ALBA L. HOLMES, OF GRAND RAPIDS, MICHIGAN.

METER CONNECTION.

No. 913,892.  Specification of Letters Patent.  Patented March 2, 1909.

Application filed November 4, 1907. Serial No. 400,671.

*To all whom it may concern:*

Be it known that I, ALBA L. HOLMES, a citizen of the United States, residing at Grand Rapids, in the county of Kent and State of Michigan, have invented certain new and useful Improvements in Meter Connections, of which the following is a specification.

My invention relates to improvements in appliances for connecting water meters with a water main, and its objects are: first, to provide a means whereby the meter may be readily and conveniently inserted to or removed from a main, and, second, to provide a means whereby a water tight joint may be made between the intake, and the outflow pipes of a water meter without the use of a series of small bolts at each coupling point. I attain these objects by the mechanism illustrated in the accompanying drawing in which—

Figure 1:
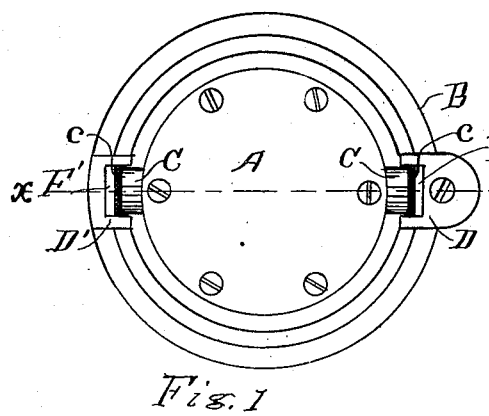
Figure 2:
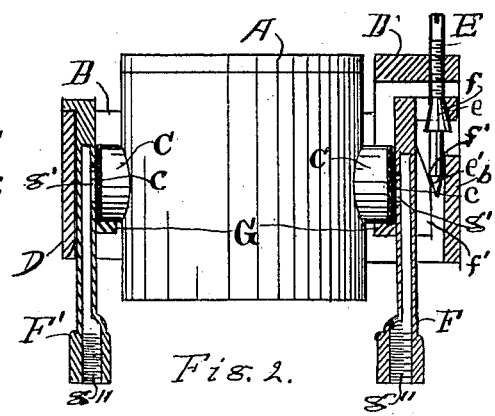
Figure 3:
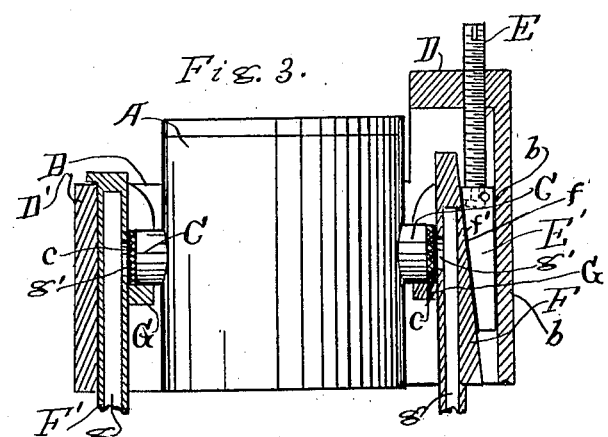
Figure 4:
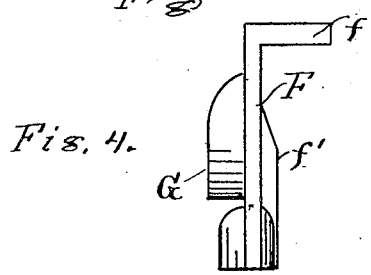
Figure 5:
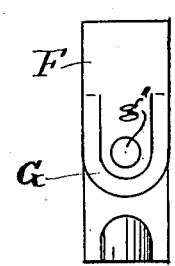

Figure 1 is a top plan of a water meter connected in my supporting device. Fig. 2 is an elevation of the meter shown supported in my device, the latter shown in section upon the line $x\ x$ of Fig. 1. Fig 3 is the same showing a modified form of clamping device. Fig. 4 is a side elevation of one of the coupling bearings detached from its supporting ring, and Fig. 5 is a front elevation of the same.

Similar letters refer to similar parts throughout the several views.

A represents the water meter. My supporting device consists of the ring B having a bearing D at one side and D' at the other side, so arranged that the pipe connections F and F' may be placed in them in position to receive the lugs C C of the meter, upon the supporting lugs G G so that a gasket or packing $c\ c$ may be placed between the ends of the lugs G G and the sides of the pipe connections F and F', in the proper position to form a water tight bearing between the two around the holes $c\ c$ in the lugs and the sides of the pipe connections, substantially as shown.

The appliance for forming a water tight joint between the ends of the lugs G G and the sides of the pipe connections F F' consists of a wedge so formed that it will be supported laterally by the wall $b$ of the ring B and the opposite side will act upon the surface of the pipe connection F, at $f'$, so that when the screw E is screwed downward it will force the pipe connection F firmly against the end of the adjacent lug G on the meter and the opposite lug C firmly against the pipe connection F' thus forming, with the packing $c\ c$, a water tight joint at both connections.

In Fig. 2 I have shown the bolt E as having an inclined bearing $e$ centrally located, which is designed to act upon the bearing $f$ on the water connection F, to draw the water connection away from the lug on the meter, otherwise the results attained by the construction shown in Figs. 2 and 3 are identical and are attained in exactly the same way by the incline E', shown in Fig. 3, and by the incline $e'$ in Fig. 2 acting upon the water connection F to force it toward the meter.

$g\ g$ represents the water channel through the pipe connections F and F', into which the holes $g'$ open, and $g''$ represents a screw thread formed in the pipe connections so that these connections may be screwed upon the ends of the inflow and outflow pipes of a water main in the usual manner of making the connections between two or more pieces of small water pipe.

Having thus fully described my invention, what I claim as new and desire to secure by Letters Patent of the United States, is:

1. In combination with a water meter and its supporting lugs, a ring encircling the meter, pipe connections between the lugs and the ring, an incline on one of the pipe connections, a bearing formed upon the ring above the pipe connection with the incline thereon, and a bolt screwed through said bearing in position to act upon the inner surface of the ring and the incline on the pipe connection to force the pipe connection firmly against the lugs on the meter.

2. In combination with a water meter and its supporting lugs, a ring encircling the meter, pipe connections arranged to engage and support the lugs on the meter, an arm projecting at right angles from the top of one of the pipe connections and having an aperture through it, a bearing on the ring, a bolt passing through the aperture in the arm on the pipe connection and screwed through the bearing on the ring, an incline formed on the back of the pipe connection, a cone formed on the end of the bolt in position to act upon the incline on the pipe connection, acting as a wedge to force the pipe connections against the supporting lugs, and an incline formed on the body of the bolt in position to act upon the arm at the upper end of the pipe connection to draw the connection away from the lug on the meter.

3. In combination with a water meter and its lugs, a supporting ring surrounding the meter, a bearing integral with and extending upward from the ring with a lug formed thereon and having a screw threaded hole through said lug, a screw threaded bolt supported in the screw threaded hole in the lug, and having a tapering portion connected therewith, pipe connections between the ring and the lugs on the meter, one of said connections having an inclined contact surface to engage the surface of the tapering portion connected with the bolt to force the pipe connections firmly against the lugs to form water tight joints therewith when the bolt is moved lengthwise in one direction and to release the pipe connections and break the water tight joints when the bolt is moved in the opposite direction, substantially as and for the purpose set forth.

Signed at Grand Rapids Michigan October 26, 1907.

ALBA L. HOLMES.

In presence of—
 ITHIEL J. CILLEY,
 ALLAN M. KENDRICK.